United States Patent Office 2,742,485
Patented Apr. 17, 1956

2,742,485

METHOD FOR THE PREPARATION OF TESTOSTERONE AND ITS ESTERS

Alberto Ercoli and Pietro de Ruggieri, Milan, Italy, assignors to Francesco Vismara Societa per Azioni, Como, Italy, and Alberto Ercoli, Milan, Italy No Drawing. Application January 15, 1954, Serial No. 404,378

12 Claims. (Cl. 260—397.4)

This invention relates to the production of testosterone and its esters.

It is known (Serini and Köster: B. 71, 1766, 1938) that Δ-4-androstene-3,17-dione can be converted into testosterone by treatment with ethyl orthoformate in order to protect the 3-carbonyl group under the form of enol ethyl derivative, by further reduction of the 17-carbonyl group into an hydroxyl group followed, at last, by regeneration of the 3-carbonyl group by hydrolysis.

It is also known that, as agents capable of forming intermediates, wherein the 3-carbonyl group is protected and not reducible, other substances, e. g., alcohols, thioalcohols, glycols, thioglycols instead of ethyl orthoformate, may be used.

All the above mentioned methods have the same disadvantage: if in the reaction between Δ-4-androstene-3,17-dione and ethyl orthoformate—or the other beforementioned substances having an analogous function—the stoichiometric quantities are employed, the yield of 3-enol-ethyl ether—or of another equivalent compound according to the reagent used—is quite unsatisfactory; if, on the other hand, an excess of ethyl orthoformate—or, instead of this, an excess of a reagent chosen among those beforementioned—is used, also the 17-carbonyl group unfortunately enters, in part, into the reaction. In such a way—besides the desired derivative of Δ-4-androstene-3,17-dione having a protected 3-carbonyl group—also the formation of other secondary products always occurs, which reduce remarkably the yield of product that may be used and in which both 3 and 17 carbonyl groups have reacted; for this reason they are not suitable to the continuance of the process, and further operations are required to recover the androstendione tied up in them.

The present invention relates to a process—whose steps are illustrated by the formulas from I to VII represented in columns 5 to 8 hereof—for converting Δ-4-androstene-3,17-dione (I) into testosterone (VI) and its esters (VII) so to eliminate the abovementioned drawbacks: in fact, according to the invention, a selective reaction is used to transform at first the 17-keto group of the starting diketone into a group incapable of being enolised and acetalysed and therefore not capable of reacting with ethyl orthoformate or with other analogous reagents; this selective reaction consists in treating the Δ-4-androstene-3,17-dione (I) with acetone cyanhydrin as a donor of hydrogen cyanide; by this procedure, only the 17-monocyanohydrin of the Δ-4-androstene-3,17-dione—that is a mixture of the two epimers: Δ-4-androstene-17β-cyan-17α-ol-3-one and Δ-4-androstene-17α-cyan-17β-ol-3-one (II)-in a practically quantitative yield is obtained.

During this treatment the 3-carbonyl group conjugated with the double bond 4–5 does not react with acetone cyanhydrin (whilst it is to be pointed out that, if hydrogen cyanide or alkaline cyanides combined with acids are used instead of acetone cyanhydrin, the reaction develops in a different way).

The crude product obtained by filtration from the reaction mass after dilution with water may be directly used, after drying, for the further transformations. This product, androstendione-17-monocyanohydrin (II), has only a 3-carbonyl group that is easily enolisable or acetalisable. This product is then treated in benzene solution with an excess of ethyl orthoformate in the presence of alcoholic hydrogen chloride: a practically quantitative yield of 3-enolethyl ether of the androstendione-17-cyanohydrin, or 3-ethoxy Δ-3,5 androstadien-17-cyan-17-ol, mixture of the two epimers (IIIa where Alk=C₂H₅) M. P. 207° C. (dec.) is obtained; afterwards the product obtained in the crude state by evaporation from the reaction liquid is submitted, after addition of a small amount of pyridine, to the combined action, in the hot, of an alkali metal and an aliphatic alcohol having a low molecular weight—e. g., sodium and propyl alcohol: simultaneously eliminating hydrogen cyanide from the molecule of the 3-enol-ethyl ether of the androstendione-17-cyanohydrin and generating in position 17 a hydroxyl group; by direct acidification, in the hot, with hydrochloric acid, of the reaction liquid diluted with water and slow cooling, crystals of already remarkably pure testosterone (VI) are obtained, M. P. 149–151° C. in a yield superior to 90% of the theoretical value based on the androstendione-17-monocyanohydrin (II) and a little inferior to 90% of the theoretical value based on the starting androstendione.

The process according to the invention allows by a little variant the production in a high yield also of the esters of testosterone: the solution in propyl alcohol (or other alcoholic solution) that is obtained after the described treatment with sodium (or with another alkali metal) of the 3-enol-ethyl ether of the androstendione-17-monocyanohydrin, is diluted without acidification and the 3-enol-ethyl ether of testerone, i. e. 3-ethoxy-17-hydroxy-Δ³,⁵-androstadiene (IVa where Alk=C₂H₅) which separates off in the crystalline form, is filtered, washed with water, dried in vacuum and, at last, acetylated at the hydroxyl with an organic carboxylic acid anhydride in the presence of pyridine, e. g., with acetic, propionic, β-cyclopentylpropionic, valerianic anhydride or generally with any acylating agent, obtaining the corresponding 17-esters, e. g., the acetate (M. P. 128–130° C.), the propionate (M. P. 154–156° C.), the β-cyclopentylpropionate (M. P. 89–90° C.) the valerianate (M. P. 102–104° C.) or other esters of the 3-enol-ethyl ether of testosterone, which are novel compounds forming a further object of this invention. From these 3-enol-ethyl-ethers-17-esters of testosterone i. e. 3-ethoxy-17-acyloxy-Δ³,⁵-androstadiene (Va where Alk=C₂H₅; Acyl=radical of organic acid) by careful hydrolysis in the presence of acetone and a trace of acid, the desired esters of testosterone (VII where Acyl=radical organic acid) are obtained: e. g., the acetate (M. P. 139° C.), the propionate (M. P. 121° C,), the β-cyclopentyl propionate (M. P. 101° C), the valerianate (M. P. 101° C.) or another desired ester. These esters are in this manner directly prepared in a high yield without isolating the testosterone in the free state.

As a variant of the process of the invention, benzyl alcohol in the presence of p. toluensulfonic acid can also be reacted, instead of ethyl orthoformate, with androstendione-17-monocyanohydrin (II)-prepared as described above—: the 3-enol-benzyl ether of the androstendione-17-cyanohydrin or 3-benzyloxy-Δ³,⁵-androstadiene-17-cyan-17-ol (M. P. 199–200° C. dec.—IIIa where: Alk=C₆H₅—CH₂) is obtained; this compound is now transformed by means of sodium and propyl alcohol into the 3-enol-benzyl ether of testosterone (M. P. 152–153° C.—IVa where: Alk=C₆H₅—CH₂) and then into testosterone (VI) or through the esters of the enol-benzyl ether itself i. e. through the 3-benzyloxy-17-acyloxy-Δ³,⁵-androstadienes which are also novel compounds forming a further object of this invention (Va where: Alk=C₆H₅—CH₂; Acyl=radical of organic acid) into the esters of the testosterone (VII).

Always as a variant of the process instead of using a monovalent alcohol such as benzyl alcohol, a polyvalent alcohol may be employed: as an intermediate product, a cyclic ketal (instead of an enol ether) is obtained: e. g., by reacting androstendione-17-monocyanohydrin (II) with ethylene-glycol, the 3-ethylene-glycol-ketal of the androstendione-17-monocyanohydrin (M. P. 187° C. dec.—IIIb where X=CH₂—CH₂) is obtained.

From this compound by treatment with sodium and propyl alcohol, the ethylene-glycol-ketal of testosterone is obtained, M. P. 180° C. (VIb where X=CH₂—CH₂) convertible, analogously to what has been described for the previous cases, into testosterone, or through the ketal esters (Vb where X=CH₂—CH₂; Acyl=radical of organic acid) into the esters of testosterone (VII).

In order that the invention may be well understood the following examples are given as illustrations only:

Example 1

14.8 g. of Δ-4-androstene-3,17-dione are dissolved, with gentle heating and agitation, in 21 cc. of crude acetone cyanhydrin freshly prepared according to Wagner and Baizer (Org. Synt. 20, 43, Note I, 1940).

The crystallisation of the androstendione-17-monocyanohydrin occurs within a few minutes and is complete after about 2 hours. By filtration, washing with petroleum ether and drying in the vacuum at room temperature, 14.7 g. of androstendione-17-monocyanohydrin (mixture of the epimers), M. P. 178° C. (dec.) are obtained; by dilution of the mother liquors with water, another 0.9 g. of the same product having M. P. 176–178° C. (dec.) separates. The total yield is 15.6 g. (about 96% of the theoretical). (Analysis: Found percent N 4.42; for C₂₀H₂₇O₂N. Calcd. percent N 4.46. Absorption spectrum in U. V.: $\lambda_{max}^{EtOH}$ 240 mμ; 1gE 4.20). The androstendione-17-monocyanohydrin so obtained (15.6 g.) is suspended in 200 cc. of benzene. 100 cc. of the solvent are distilled in order to take out azeotropically eventual traces of moisture. To the remaining mixture brought up to 65° C. are added 17.6 g. of ethyl orthoformate, 9 cc. of absolute ethyl alcohol and 0.8 cc. of a 7% solution of hydrochloric acid in absolute ethyl alcohol (equal to 56 mg. of HCl).

After 15 minutes the product goes completely into solution and immediately thereafter, a new product begins to crystallise (if a small sample of this product is taken, it is found that its melting point is 207° C. dec. and one can conclude that it is the 3-enol-ethyl ether of the androstendione-17-monocyanohydrin, mixture of epimers. Analysis: Found percent C 77.42; H 9.11; N 4.13; for C₂₂H₃₁O₂N. Calcd. percent C 77.37; H 9.15; N 4.10. For confirming the structure of the product, HCN can be easily taken from it by means of alcohol containing a small amount of sodium or potassium hydrate: the 3-enol-ethyl ether of androstendione is obtained, M. P. 152° C.).

Continuing directly the operation without isolating this product, after another 45 minutes the reaction mixture is cooled, 0.14 cc. of pyridine are added and the liquid is evaporated in the vacuum to dryness. The crystalline residue formed by the crude 3-enol-ethyl-ether of the androstendione-17-monocyanohydrin is taken up with 400 cc. of absolute n-propyl alcohol wherein 500 mg. of sodium have been previously dissolved and the solution, warmed on a boiling water-bath, is treated with 15 g. of sodium added in small pieces during 40 minutes. When all of the sodium has passed into solution, the mixture is acidified to red-congo with 2 N hydrochloric acid and diluted with boiling water; then the most of the propyl alcohol is eliminated by distillation in the vacuum and the mixture is allowed to cool. After cooling and filtration the product which separates off is washed with water and dried: 13.1 g. of testosterone, M. P. 149–151° C. are obtained (yield 92% of the theoretical value based on the androstendione-17-monocyanohydrin; 88.5% of the theoretical based on the starting androstendione).

Example 2

The reaction is carried out with the same procedure as in Example 1 starting from 14.8 g. of Δ-4-androstene-3,17-dione up to the treatment with propyl alcohol and sodium of the 3-enol-ethyl-ether of the androstendione-17-monocyanohydrin.

The solution in propyl alcohol so obtained is diluted with hot water and allowed to crystallise; after filtration, washing with water and drying in the vacuum at ordinary temperature, 15 g. (about 92% of the theoretical based on the starting androstendione) of 3-enol-ethyl-ether of the testosterone are obtained, M. P. 119–121° C.

From this compound the esters of the testosterone may be obtained in the following manner:

(a) 7 cc. of propionic anhydride are added to the solution of 1 g. of 3-enol-ethyl-ether of the testosterone in 10 cc. of pyridine and the mixture is allowed to stand over night at room temperature. By dilution with water, filtration and drying, 1.03 g. of 3-enol-ethyl-ether of testosterone propionate are obtained, M. P. 145–148° C. (a sample of the product repeatedly recrystallised from acetone shows M. P. 156° C.). 1 g. of crude 3-enol-ethyl-ether of testosterone propionate (M. P. 145–148° C.) is dissolved in 10 cc. of acetone; five drops of concentrated hydrochloric acid are added to the solution and the mixture is warmed for 5 minutes on boiling water bath. By further dilution with hot water and crystallisation, about 850 mg. of testosterone propionate are obtained, M. P. 115–118° C., which after recrystallisation from a mixture of ether-petroleum ether shows M. P. 121° C. (for testing the structure of the product the saponification with potassium methyl alcoholic hydrate may be effected: testosterone is obtained).

(b) By a perfectly analogous treatment of 1 g. of 3-enol-ethyl-ether with acetic anhydride, the acetate of 3-enol-ethyl-ether of the testosterone, as intermediate product, is obtained, M. P. 123–125° C. (after recrystallisation from methanol containing a trace of pyridine, shows M. P. 128–130° C.); then, after hydrolysis in acetone, the testosterone acetate, M. P. 137–139° C.

(c) 1 g. of crude 3-enol-ethyl-ether of testosterone dissolved in 3 cc. of pyridine is treated with 2 cc. of β-cyclopentylpropionic anhydride (obtained from the β-cyclopentylpropionic acid and acetic anhydride: B. Pt. 180° C./2 mm. Hg). After standing at room temperature overnight the mixture is diluted with water and extracted with ether, the ethereal layer, washed with water to neutrality and dried, is evaporated by vacuum. The oily residue is taken up in petroleum ether and filtered through a layer of aluminum oxide, which is afterwards washed with a further amount of petroleum ether. The solution so filtered and purified is evaporated to dryness; the crystalline residue is recrystallised from a small amount of methanol contraining a trace of pyridine: about 1 g. of 3-enol-ethyl-ether of the β-cyclopentyl propionate of testosterone, M. P. 86–88° C. is so obtained (by further recrystallisation M. P. 90–91° C.). This product (that may be employed either in the crystalline state, or in the oily one, that is, before the purification by filtration through aluminium oxide) by treatment with a small amount of hydrochloric acid in acetone solution (analogously to what is described for the preparation of testosterone propionate) yields the β-cyclopentyl propionate of testosterone, M. P. 99–101° C. (recrystallised from methanol), $[\alpha]_D^{23}=+90°$ C. (at 1% in chloroforme).

(d) 1 g. of 3-enol-ethyl-ether of testosterone is dissolved in a mixture of 2 cc. of pyridine and 2 cc. of valerianic anhydride. After 24 hours the mixture is diluted with water, extracted with ether, the ethereal layer is washed with dilute sodium hydrate and water, dried over anhydrous sodium sulfate and evaporated to dryness. The residue is recrystallised from methyl alcohol containing a trace of pyridine. About 890 mg. of 3-enol-ethyl-ether of testosterone valerianate are obtained, M. P. 97–99° C. (by further recrystallisation, M. P. 103–104° C.). The hydrolysis is effected by dilution of the obtained product in 20 cc. of acetone containing some drops of dilute hydrochloric acid and by heating during 5 minutes on boiling water bath. By dilution with water about 700 mg. of n-valerianate of testosterone are obtained, M. P. 99–100° C. (after recrystallisation from a mixture ether-petroleum ether, M. P. 101–102° C.; $[\alpha]_D^{27} = +97.50$ in solution 1% in chloroforme).

Example 3

Starting from Δ-4-androstene-3,17-dione, the androstendione-17-monocyanohydrin is prepared by carrying out the procedure as described in Example 1.

1.56 g. of androstendione-17-monocyanohydrin are suspended in 60 cc. of benzene and 10 cc. of the solvent are distilled in order to eliminate any moisture. After cooling, 2.16 g. of benzyl alcohol (quadruple of the theoretical) and about 50 mg. of p-toluenesulfonic acid are added to the solution. The mixture is refluxed during 24 hours by means of an apparatus equipped in such a way that the benzene refluxing in the flask is dried by contact with phosphoric anhydride (so as to eliminate little by little the water which forms during the reaction). During the heating nearly all the product passes into solution. After 24 hours the reaction mixture is allowed to cool. The small amount of androstendione-17-monocyanohydrin which remains unchanged and undissolved, is filtered off and, after having neutralised the p-toluenesulfonic acid with a few drops of pyridine, the liquid is completely evaporated in the vacuum to dryness. The residue recrystallised from a mixture of methanol and petroleum ether consists of 3-enol-benzyl-ether of androstendione-17-monocyanohydrin, M. P. 199–200° C. (Analysis: Found per cent C 80.37; H 8.30; N 3.49; for $C_{27}H_{33}O_2N$, Calcd. per cent C 80.36; H 8.24; N 3.47. The structure is confirmed by the fact that, by careful alkaline decomposition of a sample of this product the already known 3-enol-benzyl-ether of Δ-4-androstene-3,17-dione, M. P. 184° C. is easily obtained).

By treatment of this product, also in the crude state, with sodium and propyl alcohol, analogously to what has been said for the previous cases, and by further acidification with hydrochloric acid and dilution of the propyl solution in the hot, after cooling, the crystallisation of testosterone occurs. On the contrary if the propyl solution is diluted without acidification, the separation of 3-enol-benzyl-ether of testosterone, M. P. 148–150° C. occurs; this last product, after recrystallisation from ethanol containing a trace of pyridine shows M. P. 152–153° C.

Example 4

Starting from Δ-4-androstene-3,17-dione, the androstendione-17-monocyanohydrin is prepared carrying out the procedure as described in Example 1.

To a suspension of 1.56 g. of androstendione-17-monocyanohydrin in 50 cc. of benzene (dried in the usual manner) 2 cc. of ethylene-glycol and about 50 mg. of p-toluenesulfonic acid are added. The mixture is refluxed during 24 hours with the devices indicated in Example 3.

After cooling, the p-toluenesulfonic acid is neutralised with pyridine and from the mixture so obtained, the benzene is completely distilled in the vacuum. The residue, after crystallisation from methyl alcohol yields 580 mg. of 3-ethylene-glycol-ketal of androstendione-17-monocyanohydrin, M. P. 187° C. dec. (Analysis: Found per cent C 73.70; H 9.18; N 3.86 for $C_{22}H_{33}O_2N$, Calcd. per cent C. 73.50; H 9.25; N 3.86. The structure of the product is proved by the fact that, by alkaline scission of HCN, a sample of the product yields the already known 3-ethylene-glycol-ketal of the androstendione, M. P. 198–199° C.). From the mother liquors, another 1.150 g. of the same product M. P. 185° C. (dec.) are obtained by dilution with water. The total yield of 3-ethylene-glycol-ketal of the androstendione-17-monocyanohydrin is therefore 1.630 g. This product is dissolved in about 40 cc. of absolute propyl alcohol (where a small amount of sodium has been previously dissolved) and treated on boiling water bath with 1.7 g. of sodium added in small pieces during 40 minutes. After all the sodium is passed into solution, the mixture is diluted with hot water to the beginning of the crystallisation. After cooling about 1.5 g. of 3-ethylene-glycol-ketal of testosterone, M. P. 172–177° C. are obtained (which recrystallised from alcohol containing a trace of pyridine shows M. P. 180–181° C.).

1.5 g. of ethylene-glycol-ketal of crude testosterone are dissolved in a mixture of 15 cc. of propionic anhydride and 15 cc. of pyridine. After a night at room temperature the mixture is diluted with water. About 1.570 g. of 3-ethylene-glycol-ketal of testosterone propionate, M. P. 176° C. are obtained (Analysis: Found percent C 74.47; H 9.29; for $C_{24}H_{36}O_4$ Calcd. percent C 74.19; H. 9.34. This product presents the phenomenon of polymorphism. In fact, it may be obtained also under another form, M. P. 208–209° C. by recrystallisation from different solvents, e. g., acetone and ethanol).

This last intermediate hydrolysed in acetone solution with some drops of aqueous hydrochloric acid after dilution with water gives in a practically quantitative yield testosterone propionate.

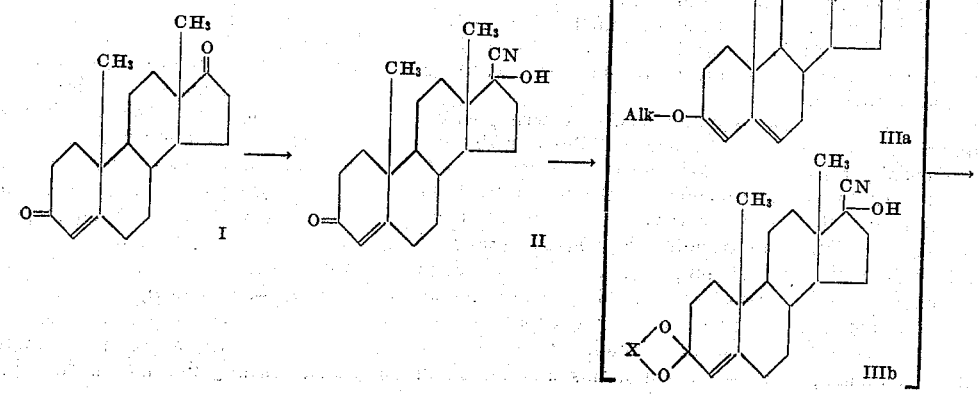

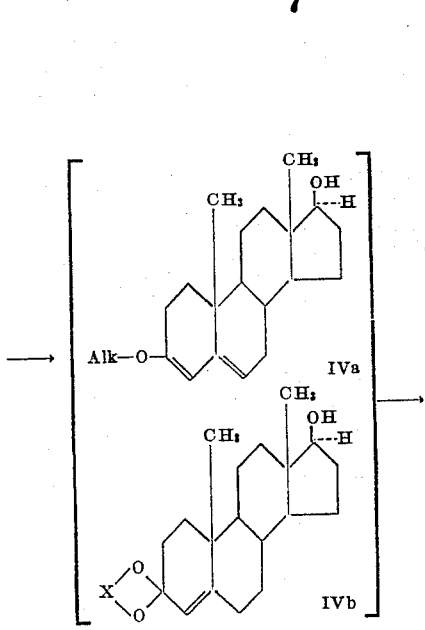
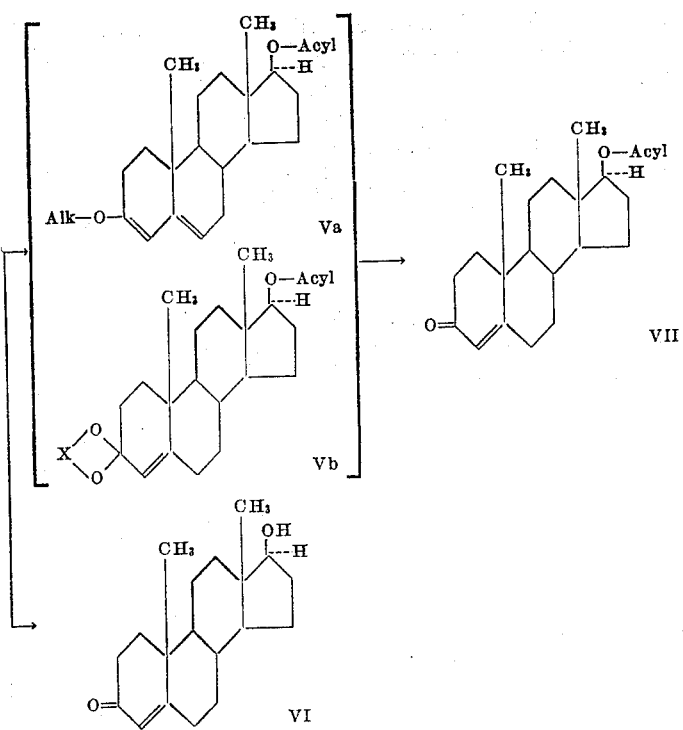

We claim:

1. A process for the preparation of testosterone which comprises reacting Δ-4-androstene-3,17-dione with acetone cyanhydrin to form Δ-4-androstene-17-cyan-17-ol-3-one; reacting this intermediate in the presence of an acid catalyst with an enol-etherifying agent selected from the group consisting of orthoformic acid esters and aryl alcohols, thereby obtaining as a second intermediate a 3-enol ether of Δ-4-androstene-17-cyan-17-ol-3-one; subjecting the second intermediate compound to the concomitant action of a boiling aliphatic alcohol of the series containing 2 to 4 carbon atoms and an alkali metal to eliminate the CN group in 17-position and to form in the alkaline alcoholic solution a 3-enol ether of testosterone; acidifying the boiling alkaline alcoholic solution with a mineral acid and diluting the same with boiling water to obtain testosterone.

2. A process as defined in claim 1 wherein ethyl orthoformate is employed to obtain as the second intermediate the 3-enol-ethyl-ether of Δ-4-androstene-17-cyan-17-ol-3-one.

3. A process as defined in claim 1 wherein benzylalcohol is employed to obtain as the second intermediate the 3-enol-benzyl-ether of Δ-4-androstene-17-cyan-17-ol-3-one.

4. A process as defined in claim 1 wherein an acid of the group consisting of mineral acids and aromatic sulfonic acids is employed as a catalyst in the enol-etherification step.

5. A process as defined in claim 1 wherein the enol-etherification step is carried out in the presence of a solvent of the series of benzene and its methyl homologues and water formed in the said reaction is removed by distillation of the same solvent forming an azeotropic mixture therewith.

6. A process for the preparation of testosterone which comprises reacting Δ-4-androstene-3,17-dione with acetone cyanhydrin to form Δ-4-androstene-17-cyan-17-ol-3-one; reacting this intermediate in the presence of an acid catalyst with an enol-etherifying agent selected from the group consisting of orthoformic acid esters and of aryl alcohols, thereby obtaining as a second intermediate a 3-enol ether of Δ-4-androstene-17-cyan-17-ol-3-one; subjecting the second intermediate compound to the concomitant action of a boiling aliphatic alcohol of the series containing 2 to 4 carbon atoms and an alkali metal to eliminate the CN group in 17-position and to form in the alkaline alcoholic solution a 3-enol ether of testosterone; diluting the said alkaline alcoholic solution with water to precipitate and isolate the 3-enol ether of testosterone; acylating the latter in the dried state at the 17-position with an organic carboxylic acid anhydride selected from aliphatic acid anhydrides corresponding to the acids containing from 2 to 5 carbon atoms and cyclopenthylpropionic anhydride, in the presence of pyridine, to obtain a 17-acyl ester of the 3-enol ether of testosterone; hydrolising the 3-enol ether function of the latter by gentle boiling in acetone in the presence of traces of mineral acid and water to obtain the corresponding testosterone 17-acyl ester.

7. A process as defined in claim 6 wherein ethyl orthoformate is employed to obtain as the second intermediate the 3-enol-ethyl-ether of Δ-4-androstene-17-cyan-17-ol-3-one.

8. A process as defined in claim 6 wherein benzylalcohol is employed to obtain as the second intermediate the 3-enol-benzyl-ether of Δ-4-androstene-17-cyan-17-ol-3-one.

9. A process for the preparation of testosterone which comprises reacting Δ-4-androstene-3,17-dione with acetone cyanhydrin to form Δ-4-androstene-17-cyan-17-ol-3-one; reacting this intermediate in the presence of an acid catalyst with an acetalysing agent selected from the group consisting of aliphatic glycols, thereby obtaining as a second intermediate a 3-cyclic glycol ketal derivative of the Δ-4-androstene-17-cyan-17-ol-3-one; subjecting the second intermediate compound to the concomitant action of a boiling aliphatic alcohol of the series containing 2 to 4 carbon atoms and an alkali metal, to eliminate the CN group in 17-position and to form in the alkaline alcoholic solution a 3-cyclic glycol ketal derivative of testosterone; acidifying the said boiling alkaline alcoholic solution with a mineral acid and diluting the same with boiling water to obtain testosterone.

10. A process as defined in claim 9 wherein ethylene glycol is employed to obtain as the second intermediate the 3-ethylene glycol ketal of Δ-4-androstene-17-cyan-17-ol-3-one.

11. A process for the preparation of testosterone which comprises reacting Δ-4-androstene-3,17-dione with acetone cyanhydrin to form Δ-4-androstene-17-cyan-17-ol-3-one; reacting this intermediate in the presence of an acid catalyst with an acetalysing agent selected from the group consisting of aliphatic glycols, thereby obtaining as a second intermediate a 3-cyclic glycol ketal derivative of the Δ-4-androstene-17-cyan-17-ol-3-one; subjecting the second intermediate compound to the concomitant action of a boiling aliphatic alcohol of the series containing 2 to 4 carbon atoms and an alkali metal to eliminate the CN group in 17-position and to form in the alkaline alcoholic solution a 3-cyclic glycol ketal of testosterone; diluting the said alkaline alcoholic solution with water to precipitate and isolate the 3-cyclic glycol ketal derivative of testosterone; acylating the latter in the dried state at the 17-position with an organic carboxylic acid anhydride, selected from alphatic acid anhydrides corresponding to the acids containing from 2 to 5 carbon atoms and cyclopentylpropionic anhydride, in the presence of pyridine, to obtain a 17-acyl ester of the 3-cyclic glycol ketal derivative of testosterone; hydrolysing the 3-cyclic glycol ketal function of the latter by gentle boiling in acetone in the presence of traces of mineral acid and water to obtain the corresponding testosterone 17-acyl ester.

12. A process as defined in claim 11 wherein ethylene glycol is employed to obtain as the second intermediate the 3-ethylene glycol ketal of Δ-4-androstene-17-cyan-17-ol-3-one.

References Cited in the file of this patent

UNITED STATES PATENTS

| 2,326,756 | Butenandt | Aug. 17, 1943 |

FOREIGN PATENTS

| 464,396 | Great Britain | Oct. 7, 1936 |
| 488,801 | Great Britain | July 14, 1938 |